United States Patent [19]

Sawdon et al.

[11] Patent Number: 5,449,984
[45] Date of Patent: Sep. 12, 1995

[54] CATHODE RAY TUBE DISPLAY APPARATUS

[75] Inventors: David Sawdon, Winchester, England; John S. Beeteson, Skelmorlie, Scotland; Peter Beanlands, Eastleigh, England

[73] Assignee: International Business Machines Corporation, Armonk, N.Y.

[21] Appl. No.: 19,942

[22] Filed: Feb. 19, 1993

[30] Foreign Application Priority Data

Feb. 20, 1992 [GB] United Kingdom ............... 9203618

[51] Int. Cl.6 ............................................. H01J 29/52
[52] U.S. Cl. ................................... 315/386; 345/127; 345/210
[58] Field of Search .................... 315/411, 386, 384; 345/127, 129, 210, 212; 348/581, 747

[56] References Cited

U.S. PATENT DOCUMENTS 3,437,873 4/1969 Eggert .

Primary Examiner—Theodore M. Blum
Attorney, Agent, or Firm—David Aker

[57] ABSTRACT

This specification concerns cathode ray tube display apparatus comprises a cathode ray tube display screen (10). A beam generator (60,30) is provided for generating at least one electron beam in the cathode ray tube display screen (10) to produce a video image. Also provided is a line timebase circuit (40) for generating a line deflection signal to sequentially address the or each electron beam to successive pixels on the screen (10) in a line of a raster, and a frame timebase circuit (50) for generating an alternating frame deflection signal for sequentially addressing the or each electron beam to successive lines of the raster. The apparatus further comprises a standby circuit (110) connected to the line and frame timebase circuits (40,50). The standby circuit (40,50) switches the deflection signals generated by the timebase circuits (40,50) between first predetermined amplitudes and second predetermined amplitudes, less than the first predetermined amplitudes, in response to a control input (100) switching between first and second predetermined states. Because the amplitudes of the deflection signals are reduced when the display is configured to operate in standby mode, both the power dissipated by, and the stray electric and magnetic fields radiating from the display can be significantly reduced during periods of temporary non-use.

4 Claims, 5 Drawing Sheets

CATHODE RAY TUBE DISPLAY APPARATUS

The present invention relates to cathode ray tube (CRT) display apparatus having a standby mode of operation in which power dissipation is reduced.

In a conventional raster-scanned colour CRT display, such as a computer visual display unit or a television receiver for example, a line timebase circuit generates a sawtooth deflection current in line deflection coils of the CRT to sequentially address three electron beams to successive pixels in a line from one side of a CRT to the other. Simultaneously, a frame timebase circuit generates a sawtooth deflection current to sequentially address the electron beams to successive lines from the top of the CRT to the bottom. Thus, in operation, the electron beams follow a zig zag pattern over the CRT screen. The zig zag pattern is usually, and will hereinafter be, referred to as a raster. The sawtooth deflection current in the line and frame deflection coils may also generate stray magnetic and electric fields that extend beyond the confines of the display.

A computer visual display unit for typical office data processing applications dissipates about 100 W during normal operation. A higher performance, larger screen, computer visual display unit for graphics applications dissipates about 300 W during normal operation. A significant fraction of the power dissipated by such displays is dissipated in the line and frame timebase circuits. In general, a colour CRT display cannot generate a video image immediately after turn on because electron guns in the CRT must be warmed up before the electron beam can be produced. The electron guns take time to reach operational temperature. Therefore, many conventional television receivers have a standby mode of operation for temporarily turning off the television picture to reduce power dissipation. In standby mode, low power circuits, such as those supplying power to heaters for the electron guns, remain in operation, but high power circuits, such as the aforementioned line and frame timebase circuits, are disabled. Because, in standby mode, the electron guns are kept at their operating temperature, the television picture can be rapidly turned back on as required, usually via a remote control. However, if the receiver has been in operating standby mode for a prolonged period, the picture may take several minutes to stabilise after subsequent turn on as the high power circuits gradually reach thermal stability in operation. Furthermore, the reliability of the high power circuits can be significantly reduced by rapidly and repeatedly turning on and off the television picture.

Some conventional computer systems, of the kind comprising a processing unit connected to a visual display unit and a keyboard, reduce power dissipation in the display unit by inhibiting the video signal from the processing unit to the display unit if no keyboard entries are detected within a predetermined time period. The high power circuits are not disabled when the video signal is inhibited. Therefore the high power circuits remain thermally stable in operation and the reliability of the display unit is not reduced. However, the line and frame timebase circuits continue to generate full scale deflection currents in the deflection coils. Therefore, the power dissipated by timebase circuits remains unchanged. Similarly, the stray magnetic and electric fields radiating from the deflection coils remain unchanged.

U.S. Pat. No. 4,641,191 describes a CRT display having a photodetector for detecting the presence of a viewer. If a viewer is not detected, the electron beam current is reduced. Therefore, both displayed image brightness and power dissipation is reduced. Again, the high power circuits are not disabled by reducing the beam current. Therefore, the high power circuit remain thermally stable in operation and the reliability of the display unit is not reduced. However, again, the line and frame timebase circuits continue to generate full scale deflection currents in the deflection coils. Therefore, the power dissipated by the deflection circuits remains unchanged. Similarly, the stray magnetic and electric filed radiating from the deflection coils remain unchanged.

In accordance with the present invention, there is now provided cathode ray tube display apparatus comprising: a cathode ray tube display screen; a beam generator for generating at least one electron beam in the cathode ray tube display screen to produce a video image; a line timebase circuit for generating a line deflection signal to sequentially address the or each electron beam to successive pixels on the screen in a line of a raster; and a frame timebase circuit for generating an alternating frame deflection signal for sequentially addressing the or each electron beam to successive lines of the raster; characterised in that the apparatus further comprises a standby circuit connected to the line and frame timebase circuits for switching the line and frame deflection signals generated by the timebase circuits between first predetermined amplitudes and second predetermined amplitudes, less than the first predetermined amplitudes, in response to a control input to the standby circuit switching between first and second predetermined states.

The present invention stems from a realisation that both the power dissipated by, and the stray electric and magnetic fields radiating from a CRT display can be significantly reduced by reducing the amplitudes of the line and frame deflection signals during periods of temporary non-use. Because the timebase circuits continue to operate to generate the deflection signals, they reach thermal stability when the display is restored to normal operation in less time than if they were turned off altogether. Furthermore, because the video image is still displayed, passersby can immediately determine, without close inspection, whether or not the display is turned on. Still furthermore, because the video image is still displayed, passersby can also determine whether or not the displayed information has changed in, for example, receipt of electronic mail.

In a preferred embodiment of the present invention, to further reduce power dissipated by the display when it is operating in standby mode, the standby circuit configures the timebase circuits to scan the or each electron beam in a first raster when the control input is set to the first state, and configures the timebase circuits to scan the or each electron beam in a second raster, of less area than the first raster, when the control input is set to a second state. In a particularly preferred embodiment of the present invention, the second raster is less than half the area of the first raster.

To further reduce the power dissipated by the display when operating in standby mode, the standby circuit may be adapted to configure the beam generator to produce the video image at a first brightness when the control input is set to the first state, and to configure the beam generator to produce the video image at a second brightness, less than the first brightness, when the control input is set to a second state.

It will be appreciated that the present invention also extends to a display system comprising a computer system connected to the cathode ray tube display apparatus described in the foregoing wherein the control input is set by the computer system.

Preferred embodiments of the present invention will now be described, by way of example only, with reference to the accompanying drawings in which.

Figure 1:
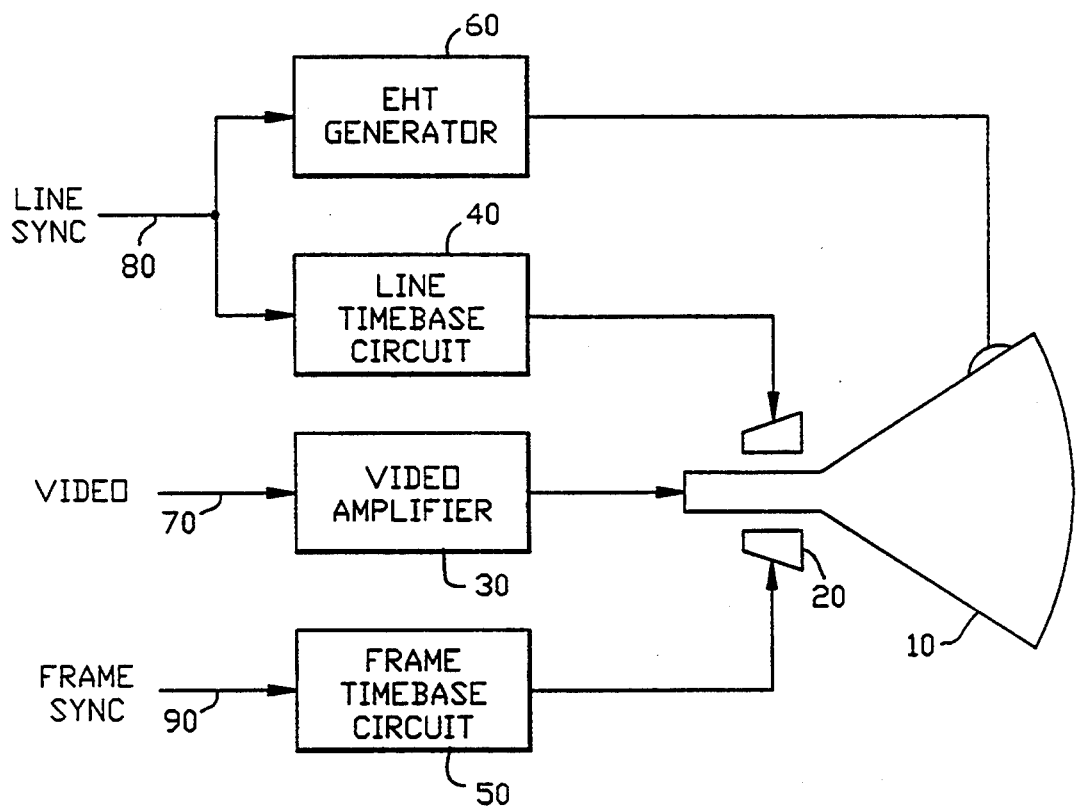
FIG. 1 is a block diagram of a conventional CRT display.

Referring first to FIG. 1, a conventional colour CRT display comprises a 400 mm diagonal colour cathode ray tube 10 having an electromagnetic coil assembly or yoke 20. A video amplifier 30 is connected to red, green, and blue electron guns (not shown) enclosed in the cathode ray tube 10. The yoke 20 comprises line and frame deflection coils (not shown) respectively connected to a line timebase circuit 40 and a frame timebase circuit 50. An Extra High Tension (EHT) voltage generator 60 is connected to the screen of the CRT 10.

In operation, the EHT generator 60 produces a voltage of typically 24 kV that accelerates electrons produced by the hot electron guns towards the screen of the CRT 10 in three electron beams. The energies of the three electron beams are respectively modulated by red, green and blue input video signals 70. The line timebase circuit generates a sawtooth deflection current in the line deflection coils for sweeping the electron beams from one side of the screen to the other during a scan period and then rapidly returning them during a line retrace period. The sawtooth current generated by the line timebase circuit typically has a peak to peak amplitude of several Amps (typically 6A peak to peak for a 400 mm diagonal CRT). To scan the electron beams over the CRT screen in a raster, the frame timebase circuit simultaneously generates a sawtooth deflection current in the frame deflection coils for sweeping the electron beams from the top of the CRT screen to the bottom during a frame scan period and then rapidly them to the top of the screen during a frame retrace period. The sawtooth current generated by the frame timebase circuit generally has a peak to peak amplitude less than that of the deflection current generated by the line timebase circuit but nevertheless in the range of several amps (typically 2A peak to peak for a 400 mm diagonal CRT). The area covered by the raster with full scale beam deflection on a 400 mm diagonal CRT is about 250×200 mm. To generate an output image, the outputs of the line and frame timebase circuits are respectively synchronised to the input video signals by input line and frame synchronisation (sync) signals, 80 and 90. The EHT generator is usually synchronised to the line sync signal. To generate a high resolution video image, the frame period is typically equivalent to hundreds of line scan periods.

Figure 2:
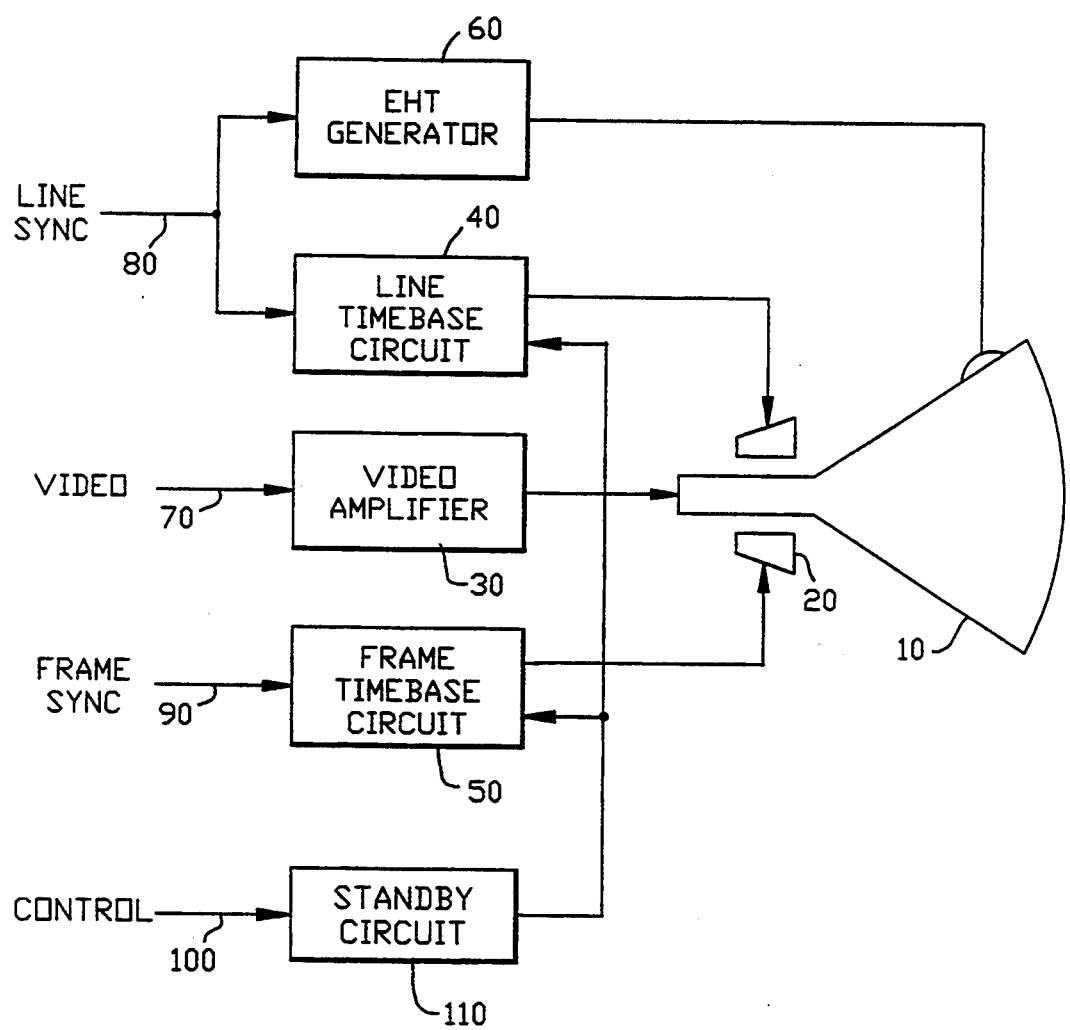
FIG. 2 is a block diagram of a CRT display of the present invention.

Referring now to FIG. 2, an example of a CRT display of the present invention further comprises a standby circuit 110 having a control input 100 for receiving a control signal and outputs connected to the line and frame timebase circuits, 40 and 50, and to the EHT generator 60.

In operation, when the control input 100 is set to a low state, the standby circuit 110 configures the line and frame timebase circuits, 40 and 50, and the EHT generator 60 to operate conventionally as described above. However, when the control input 100 is set to a high state, the standby circuit 110 configures the line and frame timebase circuits, 40 and 50, to reduce the peak to peak amplitudes of the line and frame deflection currents to around a quarter of their original values (about 1A and 0.6 A respectively for a 400 mm CRT). Because the amplitudes of the deflection currents are reduced, the area spanned by the raster falls by a corresponding amount (to typically 80 mm×60 mm for a 400 mm CRT). To prevent the electron beams from burning the phosphor coating of the CRT 10 when scanning the reduced area, the standby circuit 110 also responds to a high state in the control input 100 by configuring the EHT generator 60 to decrease the EHT voltage. The decreased EHT voltage generates lower electron beam currents. The degree of reduction of the total beam current is reduced is selected to generate an image of reduced size on the CRT screen that is of substantially the same brightness as the same image of conventional size.

Figure 3:
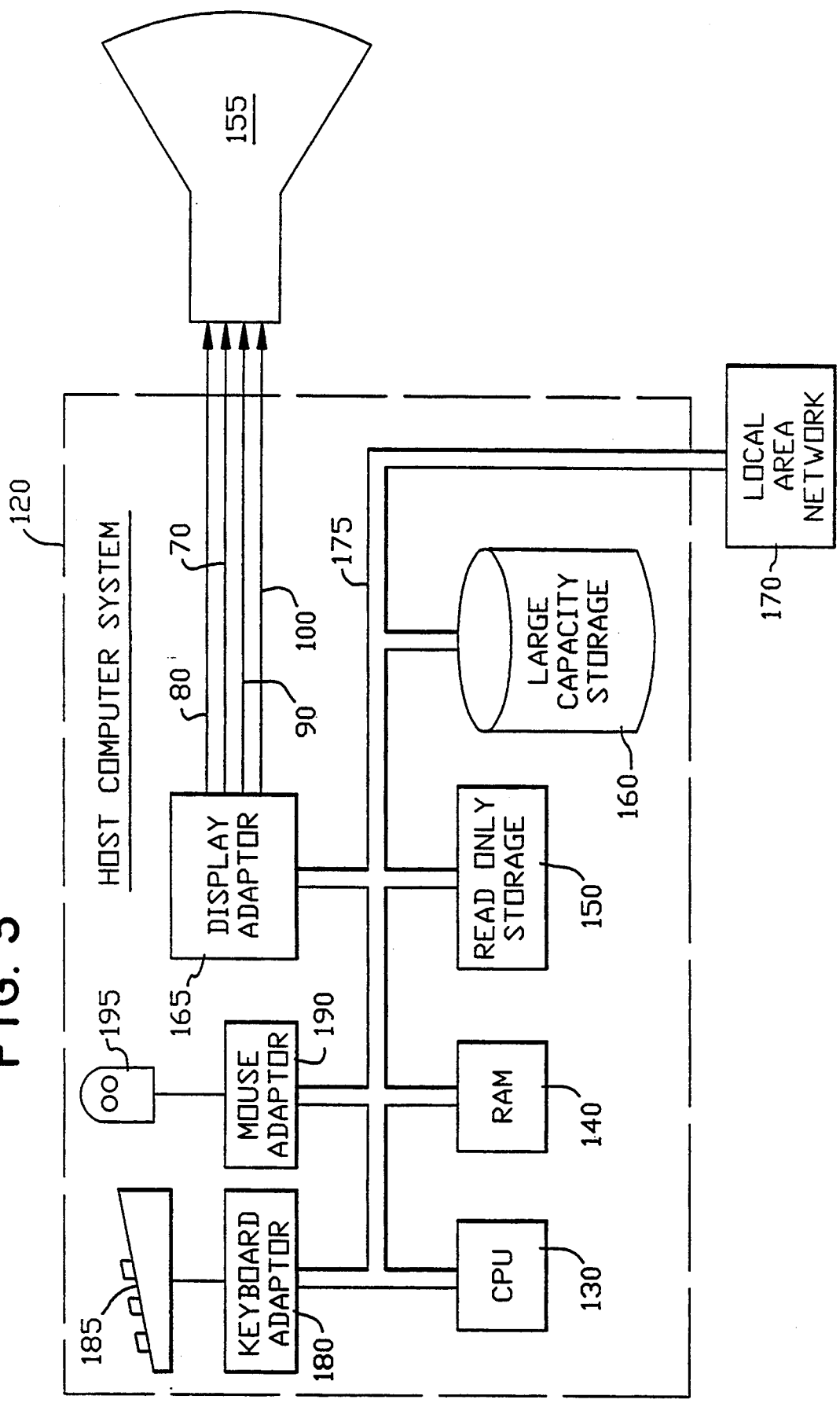
FIG. 3 is a block diagram of a display system comprising a CRT display of the present invention.

FIG. 3 shows a display system comprising a CRT display 155 of the present invention and a host computer system 120 such as a personal computer. The host computer system 120 comprises a central processing unit 130, random access memory 140, read only storage 150, and large capacity storage 160 such as a hard disk drive, tape streamer or the like, all interconnected by the bus architecture 175. The bus architecture may also be connected to other computer systems in a local area network 170. Data entry devices in the form of a keyboard 185 and a mouse 195 are connected to the bus architecture 175 via keyboard and mouse adaptors 180 and 190 respectively. The CRT display 155 of the present invention is connected to the bus architecture 175 via a display adaptor 165. The display adaptor 165 has red, green and blue video outputs 70 connected to the video amplifier 30 of the CRT display 155, and line and frame sync signal outputs 80 and 90 connected to the line and frame timebase circuits 40 and 50 of the CRT display 155. In addition, the display adaptor 165 has a control output 100 connected to the control input of the standby circuit 110 of the CRT display 155.

In operation, the processor, under the control of a computer program, configures the display adaptor to generate red, green and blue video signals, and line and frame sync signals for producing a video image on the CRT display. The processor normally configures the display adaptor to hold the control input low. However, if no commands are issued to the processor via the keyboard or the mouse during a predetermined timeout period, the processor configures the display adaptor to set the control input high. Upon subsequent detection of a command issued via the keyboard or the mouse, the processor configures the display adaptor to set the control input back to the low state. The timeout period is determined by software controlling the processor. However, it will be appreciated that, in other systems, the timeout period may be determined by a timer circuit connected to the bus architecture or by a timer circuit within the display adaptor. It will also be appreciated that, in other embodiments of the present invention, the control input to the standby circuit may be manually switched between high and low states via, for example, a remote control circuit included in the CRT display. It will further be appreciated that, in other embodiments of the present invention, the control input to the standby circuit may be automatically switched between high and low states by a proximity sensor included in the CRT display for detecting the presence of a viewer.

Figure 4:
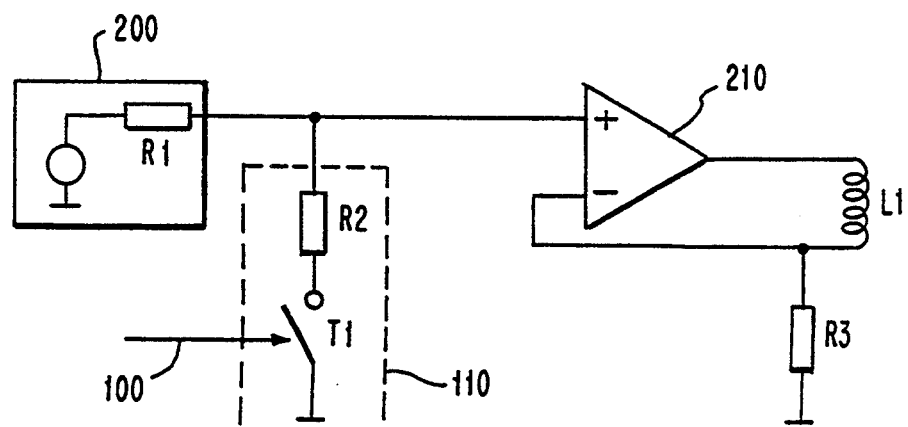
FIG. 4 is a block diagram of a frame timebase circuit for a CRT display of the present invention.

Referring now to FIG. 4, an example of a frame timebase circuit for a display of the present invention comprises a ramp generator 200 having an output resistance R1. The output of the ramp generator 200 is connected to the input of a power amplifier 210. The output of the power amplifier 210 is connected to the frame deflection coils L1. The frame deflection coils are connected to ground via a sense-resistor R3 that serves to provide negative voltage feedback to the power amplifier. In accordance with the present invention, the standby circuit 110 comprises a resistor R2 for connecting the output of the ramp generator 200 to ground via a switch T1 in response to the high state in the control input. The switch may be implemented by a bipolar transistor, field effect transistor, relay, or the like.

In operation, when the control input 100 is set to the low state, the switch T1 is open. Therefore no current flows to ground through resistor R2. The ramp signal generator 200 generates a sawtooth voltage signal that is amplified by the power amplifier 210 to produce a sawtooth deflection current in the frame deflection coils L1. When the control input 100 is set to the high state, switch T1 is closed. The output of the ramp generator is therefore connected to ground via resistor R2. Resistor R1 and resistor R2 therefore act as a potential divider that reduces the amplitude of the sawtooth voltage signal at the output of the ramp generator. The amplitude of the deflection current in the frame deflection coils L1 is therefore correspondingly reduced. R2 is selected to reduce the height of the raster (typically from 200 mm to 60 mm for a 400 mm diagonal CRT) when the control input is set to the high state.

Figure 5:
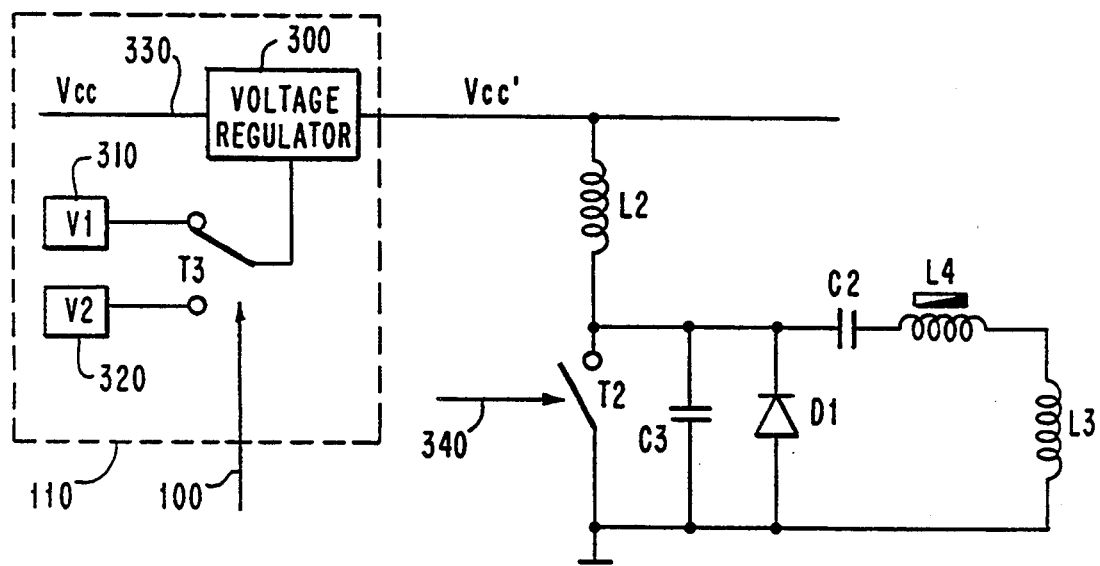
FIG. 5 is a block diagram of a line timebase circuit for a CRT display of the present invention.

Referring now to FIG. 5, an example of a line timebase circuit for a display of the present invention comprises a switch T2 for forming a current path from a high voltage supply rail Vcc', of typically 100 V, to ground through an inductor L2 in response to a drive signal 340 synchronised to the line sync signal 80. A capacitor C3 and a diode D1 are connected across the switch. The cathode of diode D1 is connected to inductor L2. The line deflection coils L3 are connected in series with a non linear inductor L4 and a capacitor C2 across switch T2. In accordance with the present invention, the standby circuit 110 comprises a voltage regulator 300 for regulating the voltage supply rail Vcc'. The voltage regulator 300 receives power from a power supply secondary winding Vcc. The standby circuit 110 further comprises a selector T3 for connecting the output of one of two reference voltage generators, 310 and 320, to a reference input of the voltage generator 300.

In operation, switch T2, capacitor C3, diode. D1, inductor L2 form a conventional flyback circuit for generating a sawtooth deflection current in the line deflection coils L4. Switch T2 may be a bipolar transistor, field effect transistor, or the like. Conventionally, inductor L4 and capacitor C2 provide S correction of the deflection current. The amplitude of the deflection current can be varied as a function of the voltage Vcc' across inductor L2. The voltage regulator 300 effectively holds the voltage supply rail Vcc' to the voltage at the reference input. Voltage generators 310 and 320 generate reference voltages V1 and V2 respectively. Reference voltage V1 is greater than reference voltage V2. When the control input 100 is set to the low state, switch T3 connects reference voltage V1 generated by voltage generator 310 to the reference input of the voltage regulator 300. Therefore, the voltage supply rail Vcc' is therefore held at reference voltage V1. The amplitude of the sawtooth deflection current generated by the flyback circuit is therefore determined by reference voltage V1. When the control input 100 is set to the high state, switch T3 connects reference voltage V2 generated by voltage generator 320 to the reference input of the voltage regulator 300. The voltage supply rail Vcc' is therefore held at the reference voltage V2. The amplitude of the line deflection current generated by the flyback circuit is therefore determined by the reference voltage V2. Reference voltage V2 is selected to reduce the width of the raster (typically from 250 mm to 80 mm for a 400 mm diagonal CRT) when the control input is set to the high state.

Figure 6:
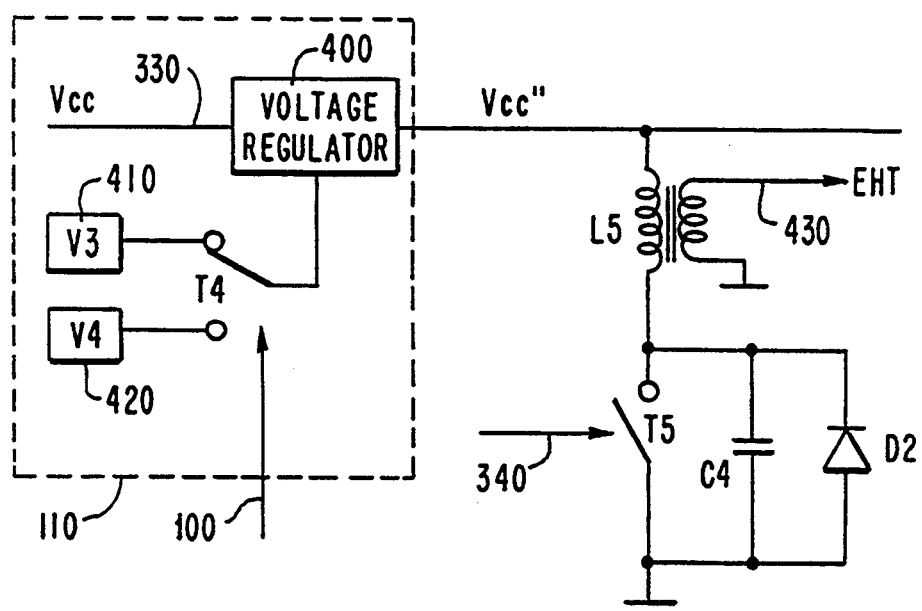
FIG. 6 is block diagram of an EHT generator for a CRT display of the present invention.

Referring now to FIG. 6, an example of an EHT generator for a display of the present invention comprises a switch T5 for forming a current path from a high voltage supply rail Vcc", of typically 100 V, to ground through an inductor L5 in response to a drive signal 340 synchronised to the line sync signal 80. A capacitor C4 and a diode D2 are connected across the switch T5. Inductor L5 has a secondary step up winding 430. The cathode of diode D2 is connected to inductor L5. In accordance with the present invention, the standby circuit 110 comprises a voltage regulator 400 for regulating the voltage supply rail Vcc". The voltage regulator 400 receives power from the power supply secondary winding Vcc. The standby circuit 110 further comprises a selector T4 for connecting the output of one of two reference voltage generators, 410 and 420, to a reference input of the voltage generator 300.

In operation, switch T5, capacitor C4, diode D2, and inductor L5 form a conventional flyback circuit for generating a pulse signal of typically 1.0 kV peak amplitude at the cathode of diode D2. The amplitude of the pulse signal is stepped up to 24 kV by the secondary winding 430 to generate the EHT voltage for biasing the CRT 10. Switch T5 may be a bipolar transistor, field effect transistor, or the like. The peak amplitude of the pulse signal at the cathode of diode D2, and therefore the EHT voltage generated across the secondary winding 430, can be varied as a function of the voltage Vcc' across inductor L5. The voltage regulator 400 effectively holds the voltage supply rail Vcc" to the voltage at the reference input. Voltage generators 410 and 420 generate reference voltages V3 and V4 respectively. Reference voltage V3 is greater than reference voltage V4. When the control input 100 is set to the low state, switch T4 connects reference voltage V3 generated by voltage generator 410 to the reference input of the voltage regulator 400. Therefore, the voltage supply rail Vcc" is therefore held at reference voltage V3. The peak amplitude of the pulse signal generated at the cathode of diode D2 is therefore determined by reference voltage V3. When the control input 100 is set to the high state, switch T4 connects reference voltage V4 generated by voltage generator 420 to the reference input of the voltage regulator 400. The voltage supply rail Vcc" is therefore held at the reference voltage V4. The amplitude of the EHT voltage generated across the secondary winding 430 is therefore determined by the reference voltage V4. Reference voltage V4 is selected to reduce the electron beam currents when the raster is reduced in size to a level which will reduce power dissipation from the video amplifier 30 and prevent the electron beams from burning the phosphor coating of the CRT. As aforementioned, the image displayed when the electron beams currents are reduced has substantially the same brightness as the conventionally displayed image. However, in other embodiments of the present invention, the standby circuit may be configured to reduce the brightness of the image when the raster is reduced in size. Furthermore, in other embodiments of the present invention, because picture size increases as the EHT voltage is decreased, the reduced deflection currents are selected to generate substantially the same size image as in conventional operation, but at a reduced brightness.

In practice, with the control input set to the high state, embodiment of the present invention hereinbefore described may dissipate as much as 96 W when displaying an image generated by a conventional software application program such as a spreadsheet, word processor or the like. However, when the control input is set to the low state, because the deflection currents generated by the line and frame timebase circuits are significantly reduced, the display may dissipate as little as 39 W when displaying the same image.

In the embodiment of the present invention hereinbefore described, the area swept by the raster is reduced from 260 mm×200 mm to 80 mm×60 mm in response to a change in the control input to the standby circuit. However, it will be appreciated that in other embodiments of the present invention, the area swept by the raster may be reduced from one value to any lower value depending on the size of the CRT screen and the reduction in power dissipation required. Indeed, it will be appreciated that, in other embodiments of the present invention, the lower value may be variable rather than fixed. For example, the lower value may be preset by initialisation software running on a host computer system. Alternatively, the lower value may be preset by hardware within the CRT-display such as a receiver circuit for a remote control or an electromechanical user control hard-wired into the standby circuit. The control input itself may determine the lower value.

Also, in the embodiment of the present invention hereinbefore described, the area swept by the raster is reduced in response to the control input being set to a high state. However, it will be appreciated that, in other embodiments of the present invention, the area swept by the raster may be reduced in response the control input being set to a low state.

Furthermore, in the embodiment of the present invention hereinbefore described, the EHT generator is separate from the line timebase circuit. It will however be appreciated that in other embodiments of the present invention, the EHT generator and the line timebase circuit may share the same flyback circuit.

The CRT display of the present invention described in the foregoing comprises a colour CRT. It will now, however, be appreciated that other CRT displays of the present invention may comprise monochrome CRTs.

We claim:

1. A cathode ray tube display apparatus comprising:
a cathode ray tube display screen;
a beam generator for generating at least one electron beam in the cathode ray tube display screen to produce a video image;
a line timebase circuit for generating a line deflection signal to sequentially address the at least one electron beam to successive pixels on the screen in a line of a raster;
a frame timebase circuit for generating an alternating frame deflection signal for sequentially addressing the at least one electron beam to successive lines of the raster; and
a standby circuit connected to the line and frame timebase circuits for switching the line and frame deflection signals generated by the timebase circuits between first predetermined amplitudes and second predetermined amplitudes, less than the first predetermined amplitudes, in response to a control input to the standby circuit switching between a first operating state and a second standby state;
wherein the standby circuit configures the timebase circuits to scan the at least one electron beam in a first raster when the control input is set to the first state, and configures the timebase circuits to scan the at least one electron beam in a second raster, of less area than the first raster, when the control input is set to the second state, whereby the area of the screen covered by the raster, and power consumed by the display apparatus, is reduced when in the standby state.

2. Apparatus as claimed in claim 1, wherein the second raster is less than half the area of the first raster.

3. Apparatus as claimed in claim 1, wherein the standby circuit is adapted to configure the beam generator to produce the video image at a first brightness when the control input is set to the first state, and to configure the beam generator to produce the video image at a second brightness, less than the first brightness, when the control input is set to a second state.

4. A display system comprising a computer system connected to cathode ray tube display apparatus as claimed in claim 1, wherein the control input is set by the computer system.

* * * * *